(12) United States Patent
Yoo

(10) Patent No.: US 10,424,945 B2
(45) Date of Patent: Sep. 24, 2019

(54) ENERGY STORAGE MANAGEMENT SYSTEM

(71) Applicant: LSIS CO., LTD., Gyeonggi-do (KR)

(72) Inventor: Anno Yoo, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 294 days.

(21) Appl. No.: 15/211,446

(22) Filed: Jul. 15, 2016

(65) Prior Publication Data

US 2017/0033573 A1    Feb. 2, 2017

(30) Foreign Application Priority Data

Jul. 28, 2015   (KR) .................. 10-2015-0106906

(51) Int. Cl.
*H02J 7/00* (2006.01)
*H02J 3/32* (2006.01)
*H02J 7/02* (2016.01)

(52) U.S. Cl.
CPC .............. *H02J 7/0021* (2013.01); *H02J 3/32* (2013.01); *H02J 7/02* (2013.01)

(58) Field of Classification Search
CPC .................................................... H02J 7/0021
USPC ......................................................... 307/71
See application file for complete search history.

(56) References Cited

U.S. PATENT DOCUMENTS 8,836,285 B2    9/2014  Yamada et al.
9,825,474 B2 *  11/2017 Tohara .................. H02J 7/0021

| | | | |
|---|---|---|---|
| 2014/0167657 A1* | 6/2014 | Nishikawa | H01M 10/441 318/139 |
| 2015/0002102 A1* | 1/2015 | Ohashi | H01M 10/441 320/135 |
| 2015/0155720 A1* | 6/2015 | Mise | H02J 7/0013 320/107 |
| 2015/0194707 A1* | 7/2015 | Park | H01M 10/4207 429/50 |
| 2016/0226268 A1* | 8/2016 | Okui | H02J 7/0018 |
| 2018/0076637 A1* | 3/2018 | Shiraki | H02J 7/0021 |

FOREIGN PATENT DOCUMENTS

| | | |
|---|---|---|
| CN | 103023085 A | 4/2013 |
| JP | 2004336970 A | 11/2004 |
| JP | 2012-182939 A | 9/2012 |
| JP | 2015012711 A | 1/2015 |
| KR | 20120025135 A | 3/2012 |
| KR | 20120063492 A | 6/2012 |
| KR | 101483517 B1 | 1/2015 |
| WO | 2014/102998 A1 | 7/2014 |
| WO | 2015/040724 A1 | 3/2015 |

OTHER PUBLICATIONS

Chinese Office Action for related Chinese Application No. 201610605740.7; action dated Jul. 3, 2018; (6 pages).

(Continued)

*Primary Examiner* — Adi Amrany

(74) *Attorney, Agent, or Firm* — K&L Gates LLP

(57) ABSTRACT

Disclosed embodiments relate to a control method of an energy management and more particularly, to an energy management system which is capable of reflecting a state of each energy storage system in the energy management system.

7 Claims, 4 Drawing Sheets

(56) References Cited

OTHER PUBLICATIONS

Japanese Office Action and English translation for related Japanese Application No. 2016-144115; action dated May 23, 2017; (12 pages).
Japanese Notice of Allowance and English translation for related Japanese Application No. 2016-144115; action dated Nov. 1, 2017; (6 pages).

* cited by examiner

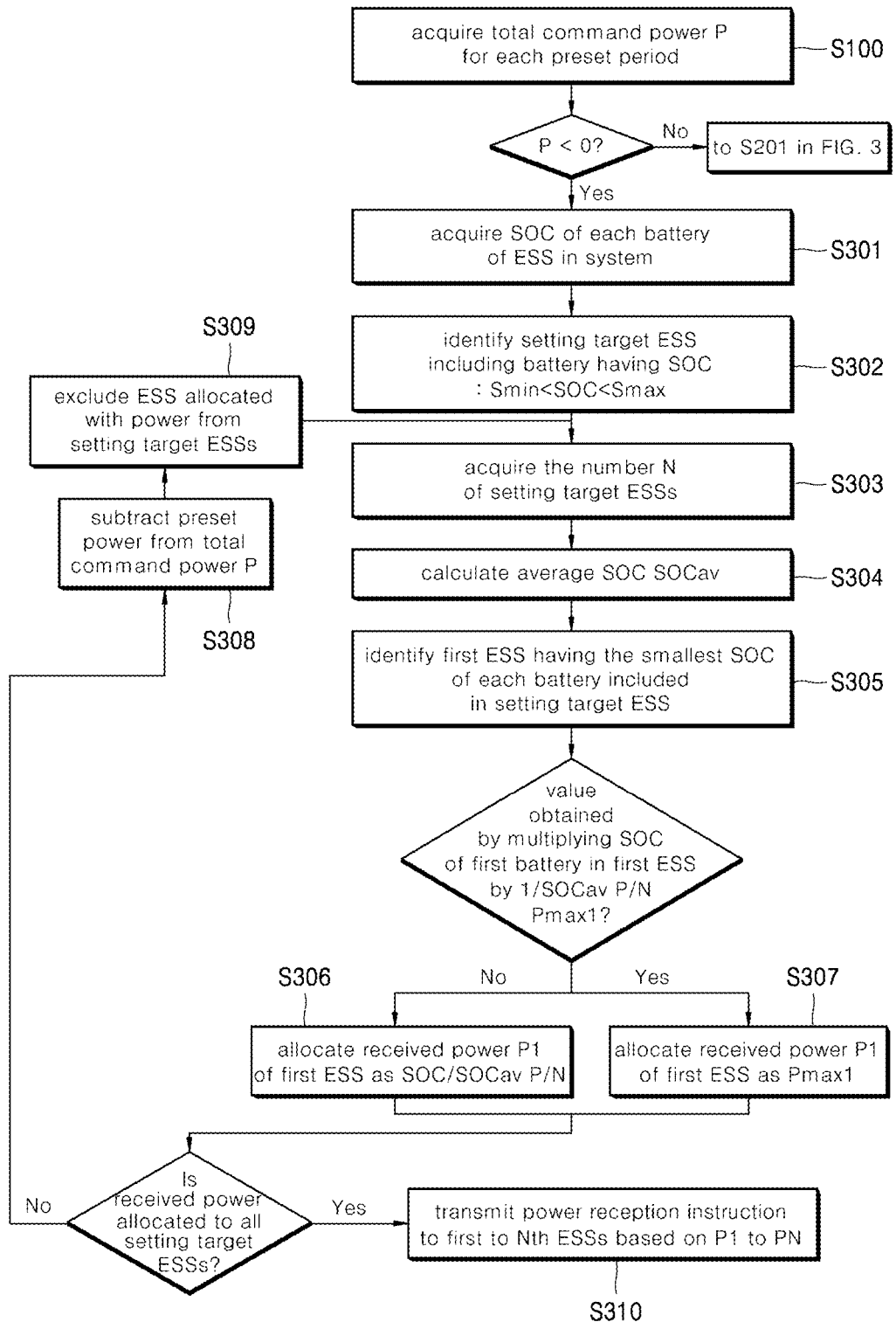

ENERGY STORAGE MANAGEMENT SYSTEM

CROSS REFERENCE TO RELATED APPLICATIONS

This application claims the benefit of Korean Patent Application No. 10-2015-0106906, filed on Jul. 28, 2015 and entitled "ENERGY MANAGEMENT SYSTEM", which is hereby incorporated by reference in its entirety.

BACKGROUND

Technical Field

The present disclosure relates to a control method of an energy management and more particularly, to an energy management system which is capable of reflecting a state of each energy storage system in the energy management system.

Description of the Related Art

With advance in industries, as demands for power are increasing and a difference in load between day and night and a difference in power consumption between seasons and between holidays are gradually increasing, deterioration of a load factor is deepening day by day.

For this reason, in recent years, a variety of load management techniques have been rapidly developed to utilize surplus power to reduce a peak load. A battery energy storage system is representative of such load management techniques.

The battery energy storage system saves surplus power at night or surplus power from wind power stations or solar power stations and supplies power to loads by discharging the saved surplus power at the time of peak load or system fault, thereby achieving peak load reduction and load levelling.

In particular, such a battery energy storage system can also be used in a smart grid which is being recently highlighted with appearance of a variety of renewable energy sources.

The battery energy storage system can be used for load levelling, peaks including, frequency regulation, emergency generator and so on for grid stabilization.

The load levelling, peaks including and frequency regulation means that the system operates in a grid-connection type and the emergency generator is used as a micro-grid including no main grid or an emergency source against black-out.

Such a battery energy storage system may include an electrical or chemical battery, an inverter, a transformer and the like. For a high-power system, a number of battery energy storage systems may be connected in parallel.

In this case, a controller for controlling the battery energy storage systems divides an output command from an upper control unit by the number of battery energy storage systems and transmits energy storage system output commands including the same value to the battery energy storage systems, respectively.

At this time, the controller can generate the output commands based on a state of charge (SOC) of a battery in each battery energy storage system.

The SOC of each battery has to fall within an allowable range. If there exists a battery including a SOC out of the allowable range, the controller can stop a power output operation based on an output command of an energy storage system including the battery.

However, if an operation of one of batteries in a plurality of energy storage systems is stopped, there is a problem that the total sum of power output from the remaining energy storage systems except the energy storage system including the battery is smaller than the sum of output commands transmitted from the controller.

This is because the output commands are generated based on an average of sums of SOCs of individual batteries with no consideration of individual batteries.

SUMMARY

It is an aspect of some embodiments of the present disclosure to provide an energy management system which is capable of overcoming the above problem.

It is another aspect of some embodiments of the present disclosure to provide an energy management system which is capable of using energy stored in each battery with high efficiency in consideration of a state of charge (SOC) of the battery.

In accordance with one aspect of some embodiments of the present disclosure, there is provided an energy management system, including: an upper control unit configured to output the total power command for each preset period; a plurality of ESSs, each of which includes a battery and is configured to output power from the battery to a grid or charge power from the grid to the battery, based on the total power command; and a controller configured to: identify setting target ESSs among the plurality of ESSs based on a state of charge (SOC) of each battery and the total power command output for each preset period; determine a power output order or a power charging order between the setting target ESSs based on the SOC of each battery included in the identified setting target ESSs; generate an ESS power command for each of the setting target ESSs based on the determined order, the total power command and the SOC of each battery; and output the generated ESS power command to each of the setting target ESSs.

In one embodiment, if it is determined that the total power command has a positive value, the controller may identify an ESS including a battery including a SOC between a preset maximum SOC and a preset minimum SOC, as a setting target ESS, based on a result of the determination.

In one embodiment, if it is determined that the total power command has the positive value, the controller may determine a power output order in terms of SOC magnitude from an ESS including a battery including the largest SOC to an ESS including a battery including the smallest SOC, among batteries including a SOC equal to or smaller than the maximum SOC.

In one embodiment, if it is determined that the total power command has a negative value, the controller may determine a power output order in terms of SOC magnitude from an ESS including a battery including the smallest SOC to an ESS including a battery including the largest SOC, among batteries including a SOC equal to or larger than the minimum SOC.

In one embodiment, if the magnitude of allocation power of the setting target ESS is smaller than the magnitude of allowable power of the setting target ESS, the ESS power command may include the magnitude of allocation power.

In one embodiment, if the magnitude of allocation power is equal to or larger than the magnitude of allowable power, the ESS power command may include the magnitude of allowable power.

In one embodiment, the magnitude of allocation power may be determined by a plurality of factors including a SOC of a battery included in the setting target ESS, an average of SOCs of all batteries included in the setting target ESSs, the total power command and the number of setting target ESSs.

In one embodiment, the magnitude of allocation power may be determined according to the following equation:

$$\text{Allocation Power Magnitude} = (SOC/SOCav) \times (P/N)$$

where, SOC is a state of charge of a battery included in the setting target ESS, SOCav is an average of SOCs of all batteries included in the setting target ESS, P is the total power command, and N is the number of setting target ESSs.

In one embodiment, the controller may acquire state information on an output unit of the setting target ESS and determine allowable power of the setting target ESS based on the output unit state information.

In one embodiment, the allowable power may be set for each of the ESSs.

According to one embodiment of the present disclosure, it is possible to provide an energy management system which is capable of detecting a SOC of a battery included in each battery energy storage system, generating an output command of power suitable for operation conditions, and performing a power output operation of the battery energy storage system including the battery with high efficiency.

BRIEF DESCRIPTION OF DRAWINGS

FIG. 4 is a flow chart showing a method of allocating input power to each ESS when each ESS absorbs power from a grid, according to another embodiment of the present disclosure.

DETAILED DESCRIPTION

Figure 1:
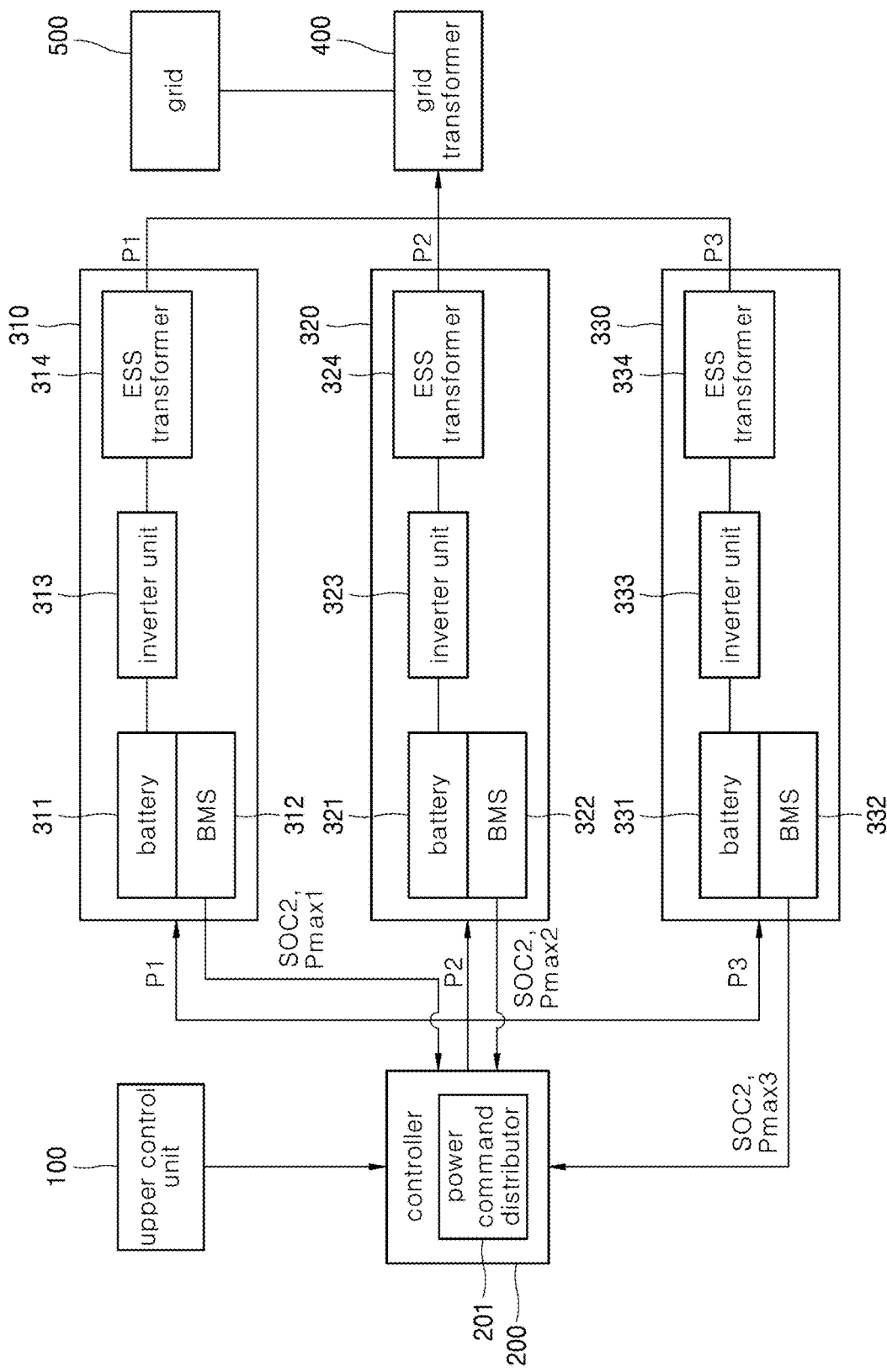
FIG. 1 is a block diagram showing an energy storage system (ESS), a controller, an upper control unit, a grid transformer and a grid according to an embodiment of the present disclosure.

Hereinafter, embodiments of the present disclosure will be described in detail in junction with the accompanying drawings. It should be understood that the present disclosure is not limited to the following embodiments, and that the embodiments are provided for illustrative purposes only. The present disclosure is not intended to exclude regressive disclosures in which other elements are added, altered, deleted, etc. The present disclosure encompasses other different embodiments which fall within the spirit and scope of the disclosure.

In the following detailed description of the present disclosure, concrete description on related functions or constructions will be omitted if it is deemed that the functions and/or constructions may unnecessarily obscure the gist of the present disclosure. In addition, an ordinal number (for example, first, second, etc.) used in the following description is just to distinguish one element from another.

Although the present disclosure is described with general terms which are currently being in wide use, terms arbitrarily selected by the applicant may be used for particular cases. In these cases, the meanings of the terms are described in relevant portions of the detailed description of the disclosure. Therefore, the present disclosure should be construed with the meaning of the terms, not just the name of the terms.

In the specification, the phrase "coupling or connecting one element and another" refers to not only directly coupling or connecting the one element and the another element but also coupling or connecting the one element and the another element by medium of still another element, unless stated otherwise.

For example, in the following description, the term 'include(s)' is not intended to exclude other elements or steps which are not enumerated in the description.

Some embodiments of the present disclosure will now be described in detail with reference to the accompanying drawings. For the purpose of easy understandings of the description, throughout the accompanying, the same elements, portions and means are denoted by the same reference numerals.

FIG. 1 is a block diagram showing an energy storage system (ESS), a controller, an upper control unit, a grid transformer and a grid according to an embodiment of the present disclosure.

The upper control unit 100 can generate a total power command P for each preset period. The upper control unit 100 can transmit the generated total power command P to the controller 200.

In one embodiment, the upper control unit 100 may output the total power command P for each preset period (for example, 2 seconds).

In another embodiment, the upper control unit 100 may output the total power command P even when receiving a total power command request signal from the controller 200.

Although three ESSs are shown in FIG. 1, the number of ESSs may be N without being particularly limited. Each ESS includes a battery which may supply power to a grid 500 or may be charged with power from the grid 500, based on the total power command.

The controller 200 can operate as an upper controller of each ESS 310, 320 and 330.

The controller 200 may be located either outside or inside each ESS 310, 320 and 330.

If the controller 200 is located outside each ESS, a separate controller (not shown) for operation of each ESS 310, 320 and 330 may be incorporated in each ESS 310, 320 and 330.

If the controller 200 is located inside each ESS 310, 320 and 330, it may have a master-slave structure in which a controller (not shown) of one modularized ESS acts as a master controller and controllers of the remaining ESSs act as slave controllers.

The controller 200 can monitor a state of each modularized ESS 310, 320 and 330 and generate charging (or input) power or discharging (or output) power P1, P2 and P3 of each modularized ESS 310, 320 and 330, as will be described in more detail later with reference to FIGS. 3 and 4.

Upon receiving the total output power command P from the upper control unit 100, the controller 200 can generate ESS power commands P1, P2 and P3, which are then transmitted to the respective ESSs 310, 320 and 330, based on the total output power command P.

The controller 200 can identify setting target ESSs among the plurality of ESSs based on a state of charge (SOC) of each battery and the total power command and determine a power output order or power charging order between the identified setting target ESSs based on a SOC of each battery included in each of the setting target ESSs.

The controller 200 can generate an ESS power command for each setting target ESS based on the determined order, the total power command and the battery SOC and output the generated ESS power command to each setting target ESS, as will be described in more detail later with reference to FIGS. 3 and 4.

When the setting target ESSs are identified, the controller 200 can determine the total power command and, based on a result of the determination, can identify an ESS in which a battery including a SOC between a preset maximum SOC and a preset minimum SOC is included, as a setting target ESS.

When the total power command has both of a positive value and a negative value, the controller 200 can control a plurality of ESSs in a different manner.

The controller 200 can output (discharge) power of the plurality of ESSs to the upper part such as the upper control unit 100 when the total power command has the positive value and can input (charge) power to the plurality of ESSs when the total power command has the negative value.

The controller 200 can control a power output order when the total power command has the positive value and a power output order when the total power command has the negative value, in a different manner.

As a result of the determination on the total power command, when the total power command has the positive value, the controller 200 can determine a power output order in terms of magnitude of SOC from an ESS including a battery including the highest SOC to an ESS including a battery including the lowest SOC among the batteries including a SOC equal to or less than the maximum SOC.

As a result of the determination on the total power command, when the total power command has the negative value, the controller 200 can determine a power output order in terms of magnitude of SOC from an ESS including a battery including the lowest SOC to an ESS including a battery including the highest SOC among the batteries including a SOC equal to or more than the minimum SOC.

The controller 200 can allocate allocation power magnitude for each target ESS. Here, the allocation power magnitude may be power magnitude allocated to be output from an ESS or power magnitude allocated to be input to an ESS.

The allocation power magnitude may be determined by a plurality of factors such as a SOC of each battery included in each setting target ESS, an average of SOCs of all batteries included in each setting target ESS, the total power command and the number of setting target ESSs.

The allocation power magnitude may be determined according to the following equation (1).

$$\text{Allocation Power Magnitude}=(\text{SOC}/\text{SOCav})\times(P/N) \quad \text{[Eq. 1]}$$

Where, SOC is a state of charge of a battery included in a setting target ESS, SOCav is an average of SOCs of all batteries included in the setting target ESS, P is the total power command, and N is the number of setting target ESSs.

The plurality of ESSs has different allowable power magnitudes Pmax for each ESS. Here, the allowable power magnitude Pmax may be power magnitude allowable for each ESS.

The allowable power magnitude Pmax may be determined from state information on an output unit of an ESS. In this case, the controller 200 can acquire state information on an output unit of a setting target ESS and determine allowable power of the setting target ESS based on the acquired output unit state information.

On the other hand, it is to be understood that the allowable power magnitude Pmax may be set for each ESS.

If the allocation power magnitude of a setting target ESS is less than the allowable power magnitude Pmax of the setting target ESS, the ESS power command may include the allocation power magnitude and the controller 200 can output the ESS power command including the allocation power magnitude to the setting target ESS.

On the other hand, if the allocation power magnitude is equal to or more than the allowable power magnitude Pmax, the ESS power command may include the allowable power magnitude and the controller 200 can output the ESS power command including the allowable power magnitude to the setting target ESS.

The controller 200 may include a power command distributor 201 which generates the ESS power commands P1, P2 and P3 based on the total output power command P set as described above.

The controller 200 may include a communication unit (not shown) which acquires SOC information of each battery 311, 321 and 331 from each battery management system (BMS) 312, 322 and 332 and acquires ESS maximum output power Pmax1, Pmax2 and Pmax3 changeable for each ESS 310, 320 and 330 from each ESS 310, 320 and 330.

The controller 200 can determine whether or not a SOC of each battery 311, 321 and 331 included in each ESS 310, 320 and 330 falls within a preset allowable range.

The controller 200 may include an ESS identification unit (not shown) which determines the number N of ESSs to allocate an output command, based on a result of the determination.

The controller 200 may include a maximum power setting unit (not shown) which sets ESS maximum output power Pmax1, Pmax2 and Pmax3 changeable for each ESS 310, 320 and 330.

Based on the ESS maximum output power Pmax1, Pmax2 and Pmax3 set by the maximum power setting unit, the controller 200 can change a pre-calculated output command to be charged or discharged by each ESS 310, 320 and 330.

The first to third ESSs 310, 320 and 330 are modularized battery energy storage systems which can be independently operated.

Each battery 311, 321 and 331 in each ESS 310, 320 and 330 is an electrical battery or chemical battery of each battery energy storage system.

Each BMS 312, 322 and 332 can detect a SOC state of each battery 311, 321 and 331 connected to each BMS 312, 322 and 332 and transmit the detected battery SOC state to each inverter unit 313, 323 and 333 or the controller 200.

Each inverter unit 313, 323 and 333 is a power converter which combines output power P1, P2 and P3 of each ESS. Each inverter unit may be configured in different ways, as will be described in detail later with reference to FIG. 2.

Each ESS transformer 314, 324 and 334 is a transformer which connects each inverter unit 313, 323 and 333 in each ESS and the grid transformer 400. Each ESS transformer 314, 324 and 334 may be independently located inside each modularized ESS or may be integrated in the form of a multi-winding transformer outside each modularized ESS.

The grid transformer 400 is a transformer which connects the grid 500 and each ESS 310, 320 and 330 and may be omitted on occasions.

The grid 500 can receive the ESS output power P1, P2 and P3 output from each ESS 310, 320 and 330.

When the grid 500 is connected to each ESS 310, 320 and 330, each ESS 310, 320 and 330 may operate in a grid-connection type. When the grid 500 is not connected to each ESS 310, 320 and 330, each ESS 310, 320 and 330 may operate as an independent voltage source.

Figure 2:
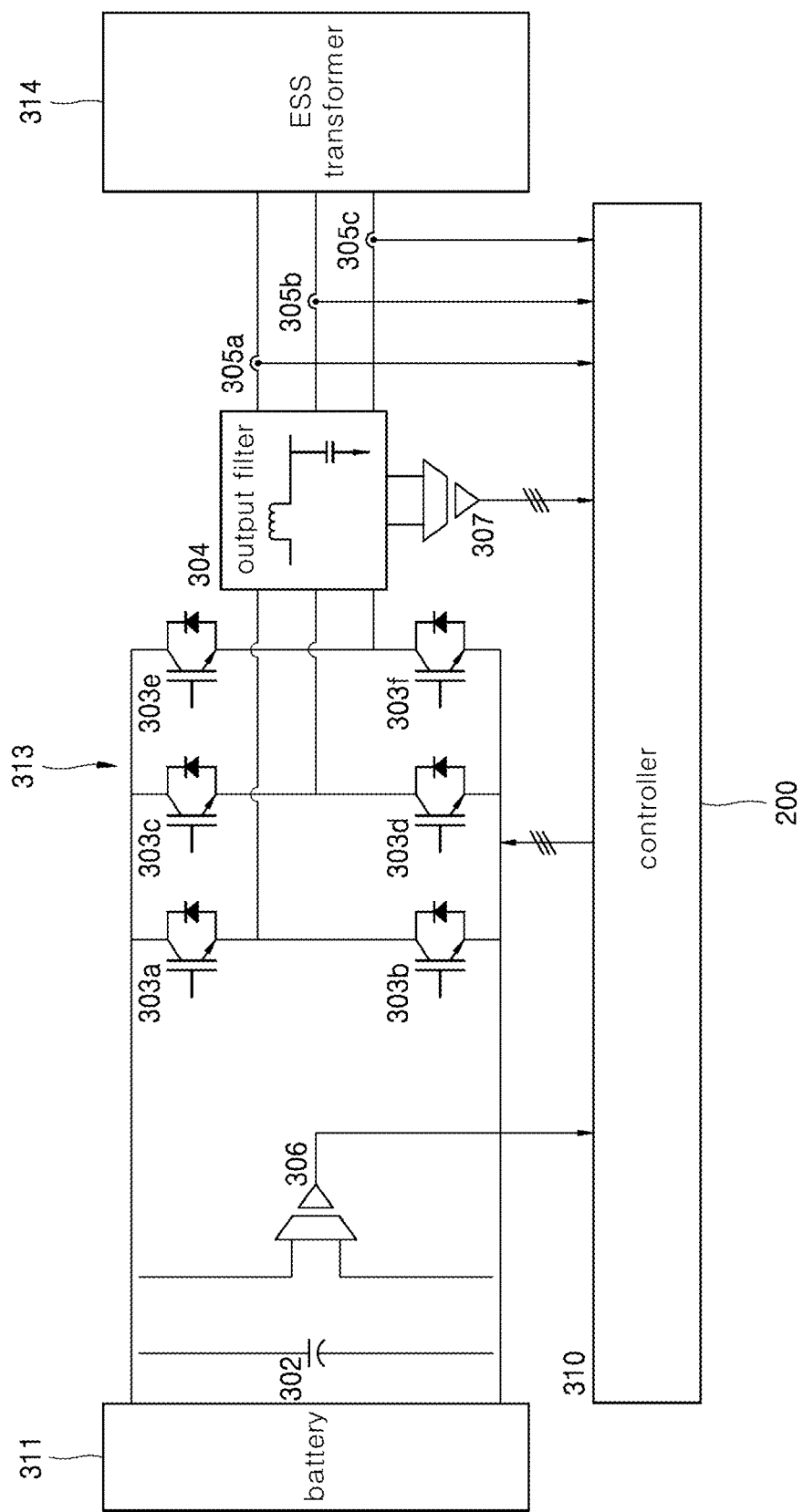
FIG. 2 is a block diagram showing an ESS and a controller according to one embodiment of the present disclosure.

FIG. 2 is a block diagram showing an energy storage system (ESS) and a controller according to one embodiment of the present disclosure.

Referring to FIG. 2, the ESS may include a battery 311, an inverter unit 313 and an ESS transformer 314.

The battery 311 can transmit/receive an AC current (or AC voltage) to/from the inverter unit 313.

The inverter unit 313 may include a capacitor 302, one or more inverters 303a to 303f, an output filter 304, first and second voltage measuring devices 306 and 307, and first to third current measuring devices 305a, 305b and 305c.

The capacitor 302 can filter an AC current output from the battery 311 or an AC current input to the battery 311 and thus can perform a buffering action for the AC current (for example, cut-off of an input or output of a transient current).

The first voltage measuring device 306 can measure the AC voltage output or input from the battery 311 and transmit information on the measured AC voltage to the controller 200.

As shown in FIG. 2, the inverter unit may be configured as a 2-level inverter consisting of inverters 303a to 303f, which are collectively denoted by reference numeral 313 in FIG. 2. The inverter unit may be configured with two or more two-level inverters connected in parallel.

The inverter unit may be configured as a 3 or more multi-level inverter instead of the 2-level inverter of FIG. 2. The inverter unit may be configured with two or more multi-level inverters connected in parallel.

When the multi-level inverters are connected in parallel, the multi-level inverters may share the battery 311 of FIG. 4.

One or more of the inverters 303a to 303f can convert the AC power output from the battery 311 or input to the battery 311 into DC power which is then output to the output filter 304.

The output filter 304 can filter the DC power output from the inverter 313 and may have a structure including an inductor and a capacitor or a structure including an inductor, a capacitor and an inductor.

The second voltage measuring device 307 can measure an output voltage of the ESS transformer 314 and transmit information on the measured output voltage of the ESS transformer 304 to the controller 200.

The first to third current measuring devices 305a to 305c may be devices for measuring a current output from the output filter 304 or a current input to the output filter 304.

Figure 3:
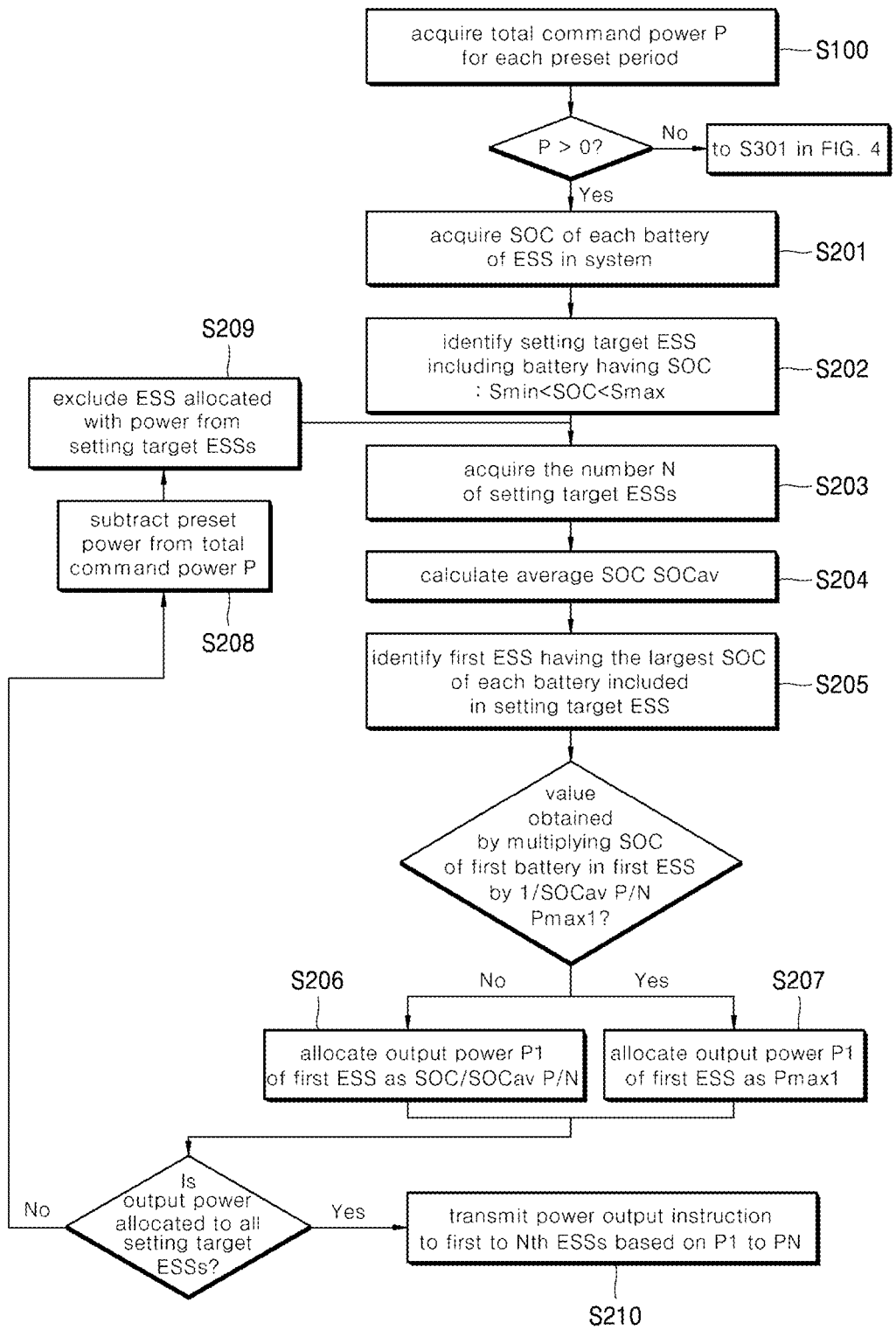
FIG. 3 is a flow chart showing a method of allocating output power to each ESS when each ESS supplies power to a grid, according to one embodiment of the present disclosure.

FIG. 3 is a flow chart showing a method of allocating output power of each ESS to each ESS, according to one embodiment of the present disclosure.

Referring to FIGS. 1 and 3, the controller 200 can acquire information on the total output command power P to be output from the upper control unit 100 to all ESSs, for each preset period (for example, 2 seconds) (S100).

The controller 200 can determine whether the acquired total output command power P has a positive value or a negative value.

If the total output command power P has the positive value (P>0), this means an operation mode where a plurality of ESSs transmits (discharges) power to the grid 500.

If the total output command power P has the negative value (P<0), this means an operation mode where a plurality of ESSs receives (charges) power to the grid 500, as will be described in more detail later with reference to FIG. 4.

Referring to FIG. 3 again, if it is determined that the total output command power P acquired from the upper control unit 100 has the positive value (e.g., if it is determined that the operation mode is a discharging mode), the controller 200 can acquire SOC (State of Charge) information of each battery included in each ESS through a BMS connected to each battery (S201).

Upon acquiring the SOC information of each battery, the controller 200 can determine whether the SOC of each battery is smaller than a preset allowable minimum SOC value Smin of the battery or larger than a preset allowable maximum SOC value Smax of the battery.

As a result of the determination, if the SOC is larger than Smin, the controller can identify a setting target ESS to which an ESS output power command has to be set, among ESSs including the battery (S202).

Each battery may have the allowable SOC maximum value and minimum value set by a maker or a user.

The controller 200 can monitor the SOC of each battery. If the SOC of a particular battery is larger than Smax or smaller than Smin, the controller 200 can stop an operation (for example, a charging or discharging operation) of the battery and can stop the generation and transmission of the ESS output power command to be transmitted to the battery.

Referring to FIG. 3 again, the controller 200 can acquire the number N of identified setting target ESSs (S203).

That is, the controller 200 can acquire the number N of ESSs including a battery whose SOC is larger than Smin, among batteries included in all ESSs in the system.

When the number of setting target ESSs is identified, the controller 200 can calculate an average SOCav of SOCs of all batteries included in the identified setting target ESSs (S204).

Here, SOCav may be a value obtained by dividing the total sum (SOC-1+SOC-2+, . . . , +SOC-N) of SOCs of batteries in the setting target ESSs by the number N of setting target ESSs (e.g., the total sum of SOCs/N).

Once SOCav is calculated, the controller 200 can identify a first ESS, which is an ESS including the largest SOC of a battery included in each ESS, among the setting target ESSs (S205).

The controller 200 can generate an output power command from the battery including the largest SOC, among the batteries in the ESS, thereby increasing efficiency of an power output (or power charging).

After the first ESS is identified, the controller 200 can determine whether or not a value obtained by multiplying the SOC of a first battery in the first ESS by 1/SOCav and a value P/N obtained by dividing the total output command power P by the number N of ESSs (e.g., an absolute value of (SOC/SOCav×P/N) is equal to or larger than an absolute value Pmax1 of preset allowable power of the first ESS.

Here, the value obtained by multiplying the SOC of a first battery in the first ESS by 1/SOCav and a value P/N obtained by dividing the total output command power P by the number N of ESSs (e.g., an absolute value of (SOC/SOCav× P/N) may correspond to allocation power of the first ESS.

If it is determined that the absolute value of (SOC/ SOCav×P/N) is equal to or larger than the absolute value Pmax1, the controller 200 can allocate/determine the output power command P1 of the first ESS as Pmax1 (S207).

If it is determined that the absolute value of (SOC/ SOCav×P/N) is smaller than the absolute value Pmax1, the controller 200 can allocate/determine the output power command P1 of the first ESS as the value of (SOC/SOCav× P/N) (S206).

Once P1 is allocated, the controller 200 can determine whether or not output power has been allocated for all setting target ESSs.

The controller 200 can identify the second ESS and the third ESS sequentially depending on the magnitude of battery SOC and can allocate/determine their respective output power commands P2 and P3 in the same manner as the output power command P1 of the first ESS.

If it is determined that there exists an ESS to which no output power is allocated, among the setting target ESSs, the controller 200 can subtract the power already allocated to each ESS from the total power (P−P1) (S208).

Thereafter, the controller 200 excludes an ESS (the first ESS) to which power is already allocated, among the setting target ESSs, from the setting target ESSs (N-1) (S209) and again acquires information on the number N-1 of setting target ESSs (S203).

The operation from S203 to S207 may be repeated until the output power command is allocated to all setting target ESSs.

When it is determined that the output power command is allocated to all setting target ESSs, the controller 200 generates power output instructions (or commands) for the first to $N^{th}$ ESSs based on the output power commands P1 to PN respectively allocated to the first to $N^{th}$ ESSs and transmits the generated power output instructions (S210).

In addition, the controller 200 can set power commands in the order from the first ESS in which a battery including the largest SOC is included to the $N^{th}$ ESS in which a battery including the smallest SOC is included.

When the generated power output commands are transmitted to each ESS, each ESS can discharge (or output) power stored in the grid according to the transmitted ESS power output commands.

While power is being discharged from each ESS, the controller 200 returns to Step S100 to acquire the total command power P for each preset period, and then repeatedly performs an operation from S301 to S310 as described below.

FIG. 4 is a flow chart showing a method of allocating ESS input power to each ESS, according to another embodiment of the present disclosure.

Referring to FIGS. 1 and 4, if it is determined that the total output command power P acquired from the upper control unit 100 has the negative value (e.g., if it is determined that the operation mode is a charging mode), the controller 200 can acquire SOC (State of Charge) information of each battery included in each ESS through a BMS connected to each battery (S301).

Upon acquiring the SOC information of each battery, the controller 200 can determine whether the SOC of each battery is smaller than a preset allowable maximum SOC value Smax of the battery and larger than a preset allowable minimum SOC value Smin of the battery.

As a result of the determination, if the SOC is smaller than Smax, the controller can identify a setting target ESS to which an ESS input power command has to be set, among ESSs including the battery (S302).

The controller 200 can monitor the SOC of each battery. If the SOC of a particular battery is larger than Smax or smaller than Smin, the controller 200 can stop an operation (for example, a charging or discharging operation) of the battery and can stop the generation and transmission of the ESS input power command to be transmitted to the battery.

Referring to FIG. 4 again, the controller 200 can acquire the number N of identified setting target ESSs (S303).

That is, the controller 200 can acquire the number N of ESSs including a battery whose SOC is larger than Smin and smaller than Smax, among batteries included in all ESSs in the system.

When the number of setting target ESSs is identified, the controller 200 can calculate an average SOCav of SOCs of all batteries included in the identified setting target ESSs (S304).

Once SOCav is calculated, the controller 200 can identify a first ESS, which is an ESS including the smallest SOC of a battery included in each ESS, among the setting target ESSs (S305).

The controller 200 can generate a charging power command from the battery including the smallest SOC, among the batteries in the ESS, thereby increasing efficiency of power charging.

After the first ESS including the first battery including the smallest SOC is identified, the controller 200 can determine whether or not a value obtained by multiplying the SOC of the first battery by 1/SOCav and a value P/N (e.g., an absolute value of (SOC/SOCav×P/N) is equal to or larger than an absolute value Pmax1 of preset allowable power of the first ESS.

If it is determined that the absolute value of (SOC/SOCav×P/N) is equal to or larger than the absolute value Pmax1, the controller 200 allocates/determines the input power command P1 of the first ESS as −Pmax1 (S307).

That the input power command is −Pmax1 can mean that the charging power command becomes Pmax1.

If it is determined that the absolute value of (SOC/SOCav×P/N) is smaller than the absolute value Pmax1, the controller 200 can allocate/determine the input power command P1 of the first ESS as the value of (−SOC/SOCav×P/N) (S306).

Once P1 is allocated, the controller 200 can determine whether or not input power has been allocated for all setting target ESSs.

The controller 200 can identify the second ESS and the third ESS sequentially depending on the magnitude of battery SOC and can allocate/determine their respective input power commands P2 and P3 in the same manner as the input power command P1 of the first ESS.

If it is determined that there exists an ESS to which no charging (or input) power is allocated, among the setting target ESSs, the controller 200 can subtract the power already allocated to each ESS from the total power (P−P1) (S308) and, thereafter, the controller 200 excludes an ESS (the first ESS) to which power is already allocated, among the setting target ESSs, from the setting target ESSs (N−1) (S309) and again acquires information on the number N−1 of setting target ESSs (S303).

The operation from S303 to S309 may be repeated until the input power command is allocated to all setting target ESSs.

When it is determined that the input power command is allocated to all setting target ESSs, the controller 200 generates power charging commands for the first to $N^{th}$ ESSs based on the input power commands P1 to PN respectively allocated to the first to $N^{th}$ ESSs and transmits the generated power charging commands (S310).

When the generated power charging commands are transmitted to each ESS, each ESS can receive (or charge) power from the grid 500 according to the transmitted ESS power charging commands.

While power is being charged to each ESS, the controller 200 returns to Step S100 to acquire the total command power P for each preset period, and then repeatedly performs the operation from S301 to S310.

While certain embodiments have been described, these embodiments have been presented by way of example only, and are not intended to limit the scope of the disclosures.

Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An energy storage management system, comprising:
    an upper control unit configured to output a total power command for each preset period;
    a plurality of Energy Storage Systems (ESSs), each of which includes a battery and is configured to output power from the battery to a grid or charge power from the grid to the battery, based at least on the total power command; and
    a controller configured to:
        identify at least two setting target ESSs among the plurality of ESSs based at least on a State of Charge (SOC) of each battery and the outputted total power command for each preset period;
        determine a power output order or a power charging order between the setting target ESSs based at least on the SOC of each battery included in the identified setting target ESSs;
        generate an ESS power command for each of the setting target ESSs based at least on the determined order, the total power command and the SOC of each battery; and
        output the generated ESS power command to each of the setting target ESSs, wherein the controller is further configured to:
        determine whether an allocation power magnitude of a setting target ESS is equal to or larger than an allowable power magnitude of the setting target ESS; and
    responsive to determining that the allocation power magnitude of the setting target ESS is equal to or larger than the allowable power magnitude of the setting target ESS, allocate a corresponding ESS power command as the allowable power magnitude, and
    wherein the allocation power magnitude is determined according to the following equation:

$$\text{Allocation Power Magnitude} = (SOC/SOC_{av}) \times (P/N)$$

where SOC is a state of charge of a battery included in any one of the at least two setting target ESSs, $SOC_{av}$ is an average of SOCs of all batteries included in the at least two setting target ESSs, P is the total power command, and N is the number of setting target ESSs.

2. The energy storage management system according to claim 1, wherein, responsive to determining that the total power command includes a positive value, the controller is further configured to identify an ESS including a battery with a SOC between a preset maximum SOC and a preset minimum SOC as a setting target ESS based on a result of the determination.

3. The energy storage management system according to claim 2, wherein, responsive to determining that the total power command includes the positive value, the controller is further configured to determine a power output order in terms of SOC magnitude from an ESS including a battery with a largest SOC to an ESS including a battery with a smallest SOC among batteries with a SOC equal to or smaller than the preset maximum SOC.

4. The energy storage management system according to claim 1, wherein, responsive to determining that the total power command includes a negative value, the controller is further configured to determine a power input order in terms of SOC magnitude from an ESS including a battery with the smallest SOC to an ESS including a battery with the largest SOC among batteries with a SOC equal to or larger than the preset minimum SOC.

5. The energy storage management system according to claim 1, wherein, responsive to determining that the allocation power magnitude of any one of the at least two setting target ESSs is smaller than the allowable power magnitude of that same setting target ESSs, the ESS power command includes the allocation power magnitude.

6. The energy storage management system according to claim 5, wherein the allowable power magnitude is set for each of the ESSs.

7. The energy storage management system according to claim 1, wherein the controller is further configured to acquire state information of each of the at least two setting target ESSs and determine the allowable power magnitude of each of the at least two setting target ESSs based on the state information.

* * * * *